United States Patent [19]

Nickipuck

[11] Patent Number: 5,694,818
[45] Date of Patent: Dec. 9, 1997

[54] LOCKING JOINT FOR A RATCHET WRENCH

[76] Inventor: Michael F. Nickipuck, 1323 W. Cossitt Ave., LaGrange, Ill. 60525

[21] Appl. No.: 705,555

[22] Filed: Aug. 29, 1996

Related U.S. Application Data

[63] Continuation of Ser. No. 570,321, Dec. 11, 1995, abandoned.

[51] Int. Cl.[6] .............................. B25B 13/46; F16C 11/00; F16D 1/12
[52] U.S. Cl. ........................... 81/60; 81/177.8; 403/97
[58] Field of Search .................. 81/177.7, 177.8, 81/177.9, 60–63.2, 328, 392, 58.3–58.5; 403/97, 93, 94

[56] References Cited

U.S. PATENT DOCUMENTS

| 139,520 | 6/1873 | Rigg ........................ 81/392 |
| 928,375 | 7/1909 | Frick . | |
| 1,109,032 | 9/1914 | Bersted . | |
| 1,499,186 | 6/1924 | Murphy ................. 81/328 X |
| 1,568,442 | 1/1926 | Carver . | |
| 1,840,685 | 1/1932 | Witherup . | |
| 2,889,160 | 6/1959 | Nelson ........................ 403/93 |
| 4,406,186 | 9/1983 | Gummow ................... 81/60 |
| 4,747,328 | 5/1988 | Howard . | |
| 4,794,829 | 1/1989 | Mesenhoeller . | |
| 5,419,221 | 5/1995 | Cole ............................. 81/60 |

*Primary Examiner*—D. S. Meislin
*Attorney, Agent, or Firm*—Lee, Mann, Smith, McWilliams, Sweeney & Ohlson

[57] ABSTRACT

A locking joint for ratchet wrench having a handle and ratchet head assembly. The locking joint comprises a pin cage having a plurality of pins designed to lock and unlock the handle, a shoulder bolt connected to the pin cage for releasing the pins from within the handle of the wrench and a guide bolt having a counter bore for receiving the shoulder bolt and connected to the ratchet head assembly. The handle is unlocked from the ratchet head assembly when the shoulder bolt is depressed by the user and the plurality of pins are withdrawn from the handle. The guide bolt in connection with the plurality of pins and shoulder bolt assists in maintaining a fixed angle between the ratchet head assembly and handle and serves to align the locking joint.

10 Claims, 4 Drawing Sheets

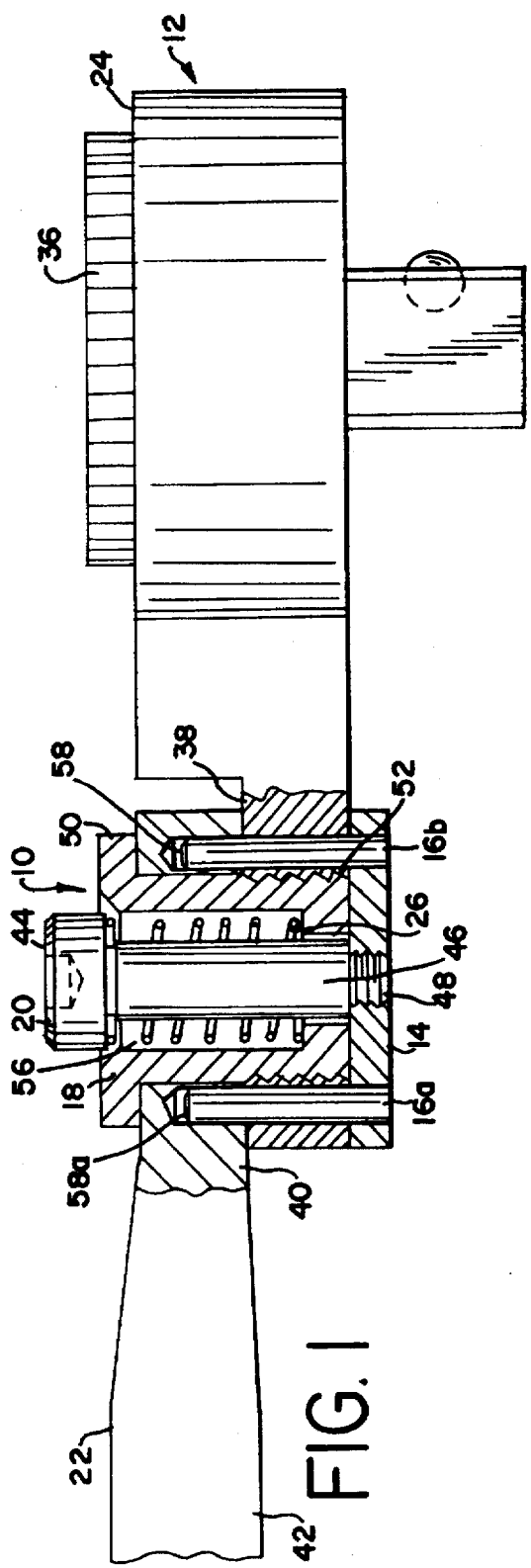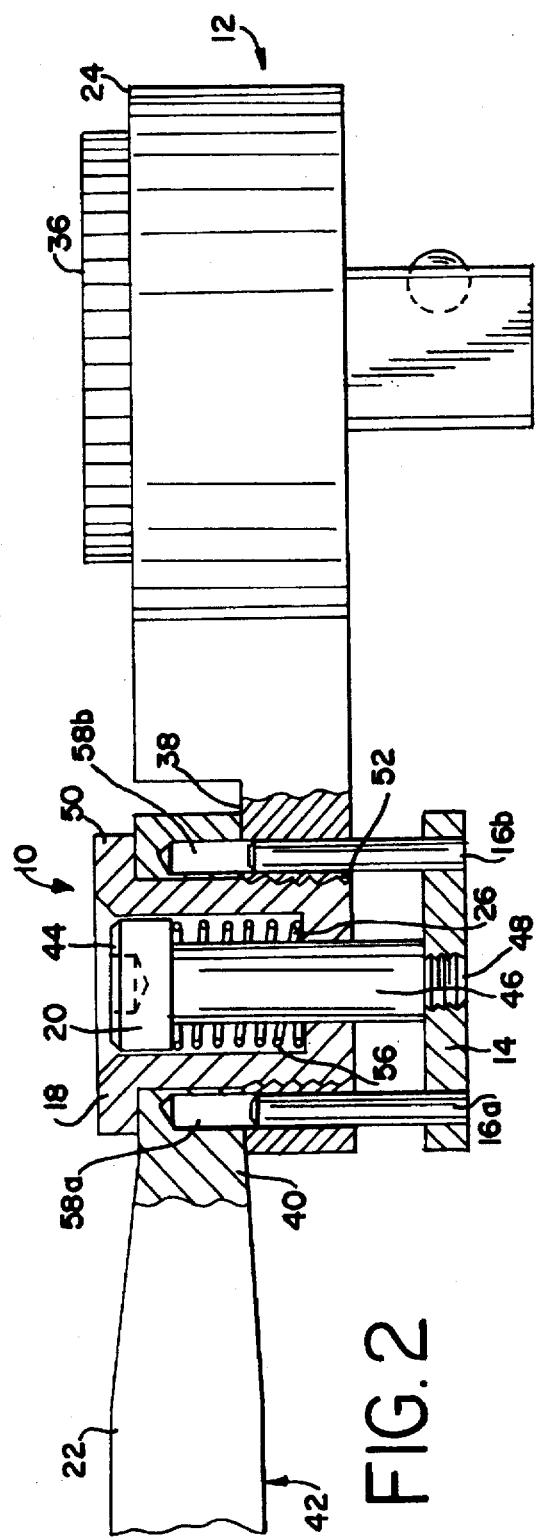

LOCKING JOINT FOR A RATCHET WRENCH

This application is a continuation of application Ser. No. 08/570,321, filed Dec. 11, 1995, now abandoned.

BACKGROUND OF THE INVENTION

1. Field of Invention

This invention is generally related to ratchet wrenches and is specifically directed to a locking joint for a ratchet wrench.

2. Description of Prior Art

Employing an adjustable angle between the head and handle of a wrench has been long known to those skilled in the art. Some of earlier mechanisms used to accomplish varying wrench angles have been relatively simple. For example, U.S. Pat. No. 1,568,442 to Carver discloses a flat wrench where the head of the wrench is designed to project at a different angles from the longitudinal axis of the handle. This simple device uses a groove and slot mechanism to hold the wrench head at different angles from the handle. Similarly, U.S. Pat. No. 928,375 to Frick discloses a wrench having a notched head for rotating the jaws of the wrench about the handle.

More complicated systems have been developed to accommodate ratchet wrenches. U.S. Pat. Nos. 4,747,328 to Howard and 4,794,829 to Mesenhoeller both disclose a ratchet wrench where the working head can be angularly positioned from the lever arm or handle. Both of these devices employ complicated and intricate working pieces, difficult to repair and expensive to manufacture. Moreover, no parts are designed to protect the head assembly from stresses placed on the ratchet mechanism itself.

More recently, a dual action ratchet wrench was been developed to permit forces on the wrench handle to be applied directly to the shank for tightening or loosening nuts. This device allows the handle to rotate 360 degrees about the shank. U.S. Pat. No. 4,406,186 to Gummow discloses a rotating handle permitting the shank to rapidly spin a nut on or off of a bolt. When the handle is lifted, it is in a clearing relationship with respect to the wrench body. The handle must then be pressed down to position the wrench for tightening the nut.

Ratchet wrenches have also been designed to lock or fix the head and handle at many angles for ease of use. U.S. Pat. No. 5,419,221 to Cole discloses a ratchet wrench where various angles between the handle and the ratchet head assembly can be fixed. This wrench uses a connecting pin aligned along an axis parallel to the shank axis to lock the head and handle into position. Like Gummow, the handle of the wrench must be lifted in order to set a new angle position. The handle therefore slides between an unlocked position and a locked position making it hard to use if working space is sparse. Also, the various loads placed on a ratchet wrench make this construction likely to fail as both torsional and shear stresses are applied at the joint. Furthermore, similar to the other prior art devices, the connecting pin is not designed to absorb any of the shock and stresses acting upon the ratchet head assembly itself.

A need exists for a ratchet wrench having a simplified and dependable locking joint easily manufactured and repairable, whereby torsional stresses to the ratchet head assembly are reduced.

SUMMARY OF THE INVENTION

The present invention is a locking joint for a ratchet wrench. The locking joint comprises a pin cage having a plurality of pins adapted to engage a handle, a shoulder bolt connected to the pin cage, and a guide bolt connected to a ratchet head assembly. The guide bolt has a counter bore for receiving the shoulder bolt. The plurality of pins slidably engage the handle to maintain a fixed position and angle between the handle and the ratchet head assembly.

The handle and ratchet head assembly are unlocked by depressing the shoulder bolt. The locking joint of the subject invention permits the handle to be rotated around the ratchet head assembly clockwise or counterclockwise, about 200 degrees. Once a desired angle is determined, the user releases the shoulder bolt and the plurality of pins slide into the handle to lock the ratchet head assembly and the wrench handle into place.

The ratchet wrench of the present invention comprises a ratchet head assembly, a handle and the locking joint. The ratchet head assembly has a ratchet head and a mounting bracket formed on the ratchet head assembly. The handle of the ratchet wrench has a gripping end and a mounting end. The locking joint of the present is disposed between the ratchet head and the gripping end of the handle.

The mounting bracket of the ratchet head assembly contains a first set of apertures positioned in and extending through said bracket. The mounting end of the handle has a second set of apertures adapted to align with the first set of apertures of the mounting bracket in any of a variety of orientations. When the first and second set of apertures are aligned, a plurality of pin orifices are formed. The pins slidably extend within the pin orifices to engage the handle. The ratchet head assembly and handle are then held in a fixed position and at a fixed angle.

In the preferred embodiment, the mounting bracket of the ratchet head assembly has an internally threaded first opening positioned in and extending through the mounting bracket for receiving the guide bolt. The guide bolt is externally threaded to provide for a threaded male/female connection with mounting bracket of the ratchet head assembly. Other means of connecting or coupling the guide bolt to the ratchet head assembly may be employed.

Similarly, the mounting end of the handle has a second opening positioned in and extending through the handle. The guide bolt extends in and through the second opening of the handle. The guide bolt comprises a shoulder which acts as a stop. The guide bolt also preferably contains a ledge designed to supported by and juxtaposed onto the mounting end of the handle. The shoulder bolt is positioned within the counter bore of the guide bolt and connects to the pin cage. The guide bolt is chamfered to restrict movement of the shoulder bolt.

As shown in FIG. 2, to unlock the position of the handle, the shoulder bolt is depressed, forcing the pin cage away from the mounting bracket of the ratchet assembly. The plurality of pins then withdraw from within the handle. The movement of the shoulder bolt is limited by the chamfer in the guide bolt. Well known to those skilled in the art, the shoulder bolt preferably comprises a shoulder head and a shank, and is threaded at one end. The shoulder head, therefore, serves as a button for the user to depress and release.

In the preferred embodiment of the subject invention, a spring is positioned within the counter bore of the guide bolt, surrounding the shank of the shoulder bolt. The spring, in connection with the guide and shoulder bolt, holds the pins within the handle. The spring permits the plurality of pins to slidably extend into and out of the handle. When the handle is unlocked, the spring is compressed, releasing the restrainment of the pin cage.

The present invention features a guide bolt and a multi-pin design that is extremely beneficial as a result of its load carrying capabilities. Because guide bolt holds the alignment of the joint in place, the stresses on the locking joint are primarily shear stress as opposed to torsional stress.

Ratchets have a high failure rate and are often abused. The most expensive part to warranty is the ratchet mechanism itself. The shear limitations of the pins can be adjusted by varying the number of pins in the assembly. To design the pins to shear before stripping or breaking the ratchet mechanism is cost beneficial to both the tool manufacturer and consumer. The size or diameter of the pins may be altered to adjust load limits.

Prior art wrenches require users to fight and try to find the next position and angle. Once determined, the user must manually push the wrench handle down into the spline joint. On the other hand, the handle of the ratchet wrench of the subject invention is never loose as it is guided by the specially designed shoulder bolt. The ratchet head hits a positive stop. And when a load is applied, the plurality of pins lock tight. Furthermore, the shoulder bolt acting as a release button protrudes far less than the prior art devices.

The manufacture of the ratchet wrench of the present invention is simplified because of the ease of assembly of the parts of the locking joint. Hence, production costs are reduced. In addition, this ratchet wrench has cost benefits over prior art wrenches because it mainly consists of drilled holes. The design of the present invention is one of the most favored and mastered metal removing processes around. Tooling costs are reduced because there is no need for custom broaches to be produced. All that is needed is an off-the-self drill bit. Moreover, the ratchet wrench of the subject invention can be easily serviced without special tools.

The subject invention is illustrated in a single preferred embodiment. This embodiment accommodates a ratchet wrench having a ratchet head assembly and a handle. The present invention is designed to be used in connection with a wide variety of ratchet heads and handle designs.

It is an object and feature of the present invention is to provide a new and useful locking joint for a ratchet wrench.

It is a further object and feature of the present invention to provide a ratchet wrench having the ratchet head and handle capable of being set at wide variety of angles.

It is yet another object and feature of the present invention to provide a ratchet wrench having a handle that may be rotated around the ratchet head assembly both in a clockwise and counter-clockwise direction.

These and other objects and features of the invention will be readily apparent from the accompanying drawing and detailed description of the preferred embodiment.

BRIEF DESCRIPTION OF DRAWINGS

FIG. 1 is an objective view of the locking joint of the present invention where the handle is locked in position.

FIG. 2 is an objective view of the locking joint of the present invention where the handle is unlocked.

DETAILED DESCRIPTION OF THE PREFERRED EMBODIMENT

Figure 3:
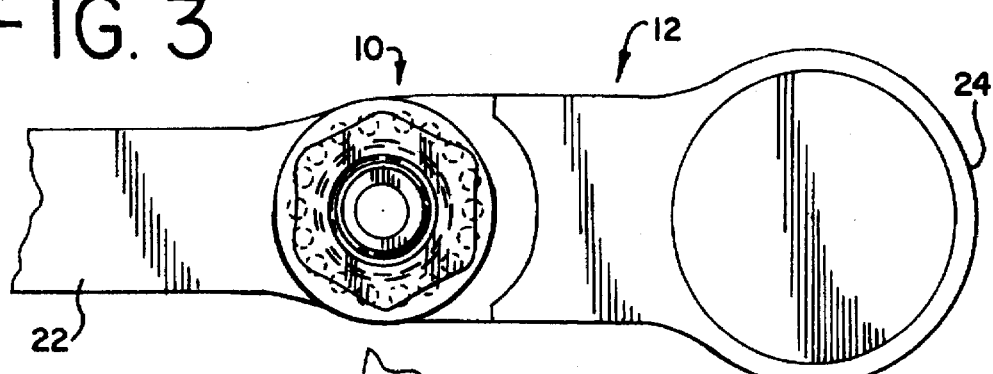
FIG. 3 is a top view of the locking joint where the handle and ratchet head assembly are set at one of many available angles.
Figure 4:
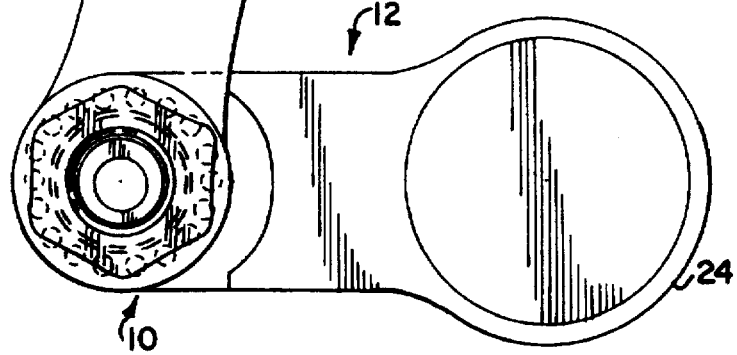
FIG. 4 is top view of the locking joint where the handle and ratchet head assembly are set at another possible angle.
Figure 5:
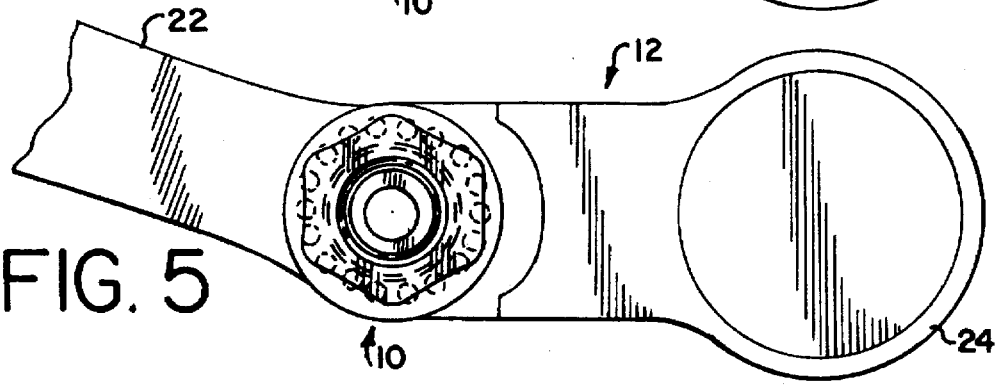
FIG. 5 is top view of the locking joint where the handle and ratchet head assembly are shown set at another possible angle.
Figure 6:
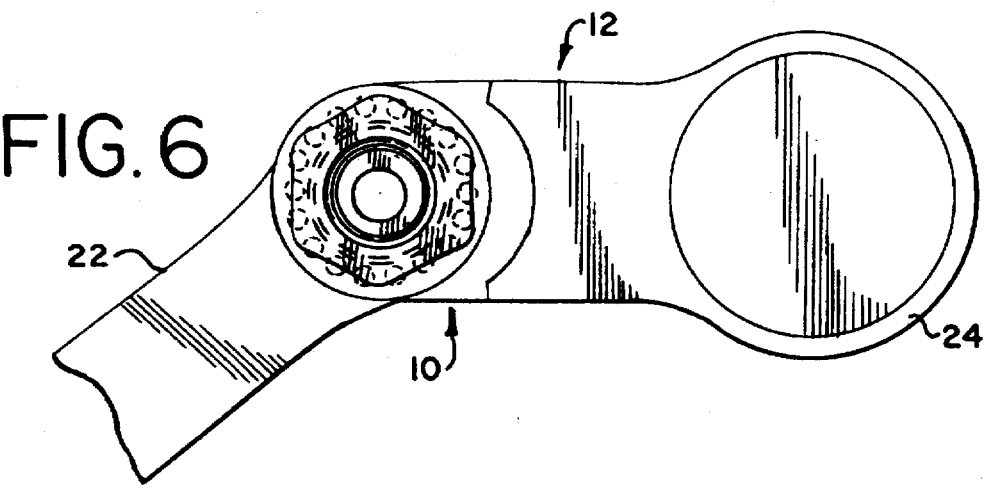
FIG. 6 is a top view of the locking joint depicting the handle and ratchet head assembly are set at another possible angle.

FIGS. 1 to 11 represent the preferred embodiment of the present invention designated generally as a locking joint 10 for a ratchet wrench 12.

As illustrated in the figures, the locking joint 10 comprises a pin cage 14 having a plurality of pins 16 adapted to engage a handle 22, a shoulder bolt 20 connecting to the pin cage 14, and a guide bolt 18 connecting to a ratchet head assembly 24. The pin cage 14 comprises a plurality of pins 16. The pin cage 14 preferably contains an internally threaded hole 60 for receiving the shoulder bolt 20. The shoulder bolt 20 has a shoulder head 44 and a shank 46. In the preferred embodiment, the shoulder bolt 20 has an externally threaded end 48 designed to be threaded to the pin cage 14 within the threaded hole 60.

In designing a locking joint 10 for a particular wrench, the number of pins 16 used sets the limits for the mount of torque which can be applied on the joint 10. The tensile strength of the pins 16 also effects the torque stresses which can be applied. Well known to those skilled in the art, tensile strength of the pins 16 is altered by the changing material hardness. Notwithstanding, if the pins should happen to shear, the pin cage 14 of the locking joint 10 of the subject invention is easily replaced. In addition, calculating shear limits also protects the ratchet head assembly 24. Because the pin cage 14 acts as a support to prevent the pins 16 from twisting, it also maintains the locking joint 10 in the best possible position against shear stress.

On the other hand, the number of apertures 28, 30 in the handle 22 and ratchet hand assembly 24 relates to the number of angles available between the handle 22 and the ratchet head assembly 24. For example, if the first and second set of apertures 28 and 30 when aligned produce eighteen (18) pin orifices 58, the angle between the handle 22 and the ratchet head assembly 24 may be set in twenty degree (20°) increments. Twelve (12) pin orifices 58 allow the angles to be set in thirty degree (30°) increments, and so on.

Furthermore, the number of pins 16 provided by the pin cage 14 does not have to equal the number of pin orifices 58. For example, the locking joint 10 could have eighteen (18) apertures 28, 30 producing eighteen (18) pin orifices 58 when aligned, and also comprise only nine (9) pins 16 as a result of accommodating stress calculations. Therefore, angle increments between the ratchet head assembly 24 and handle 22 would be set at twenty degrees (20°).

Figure 7:
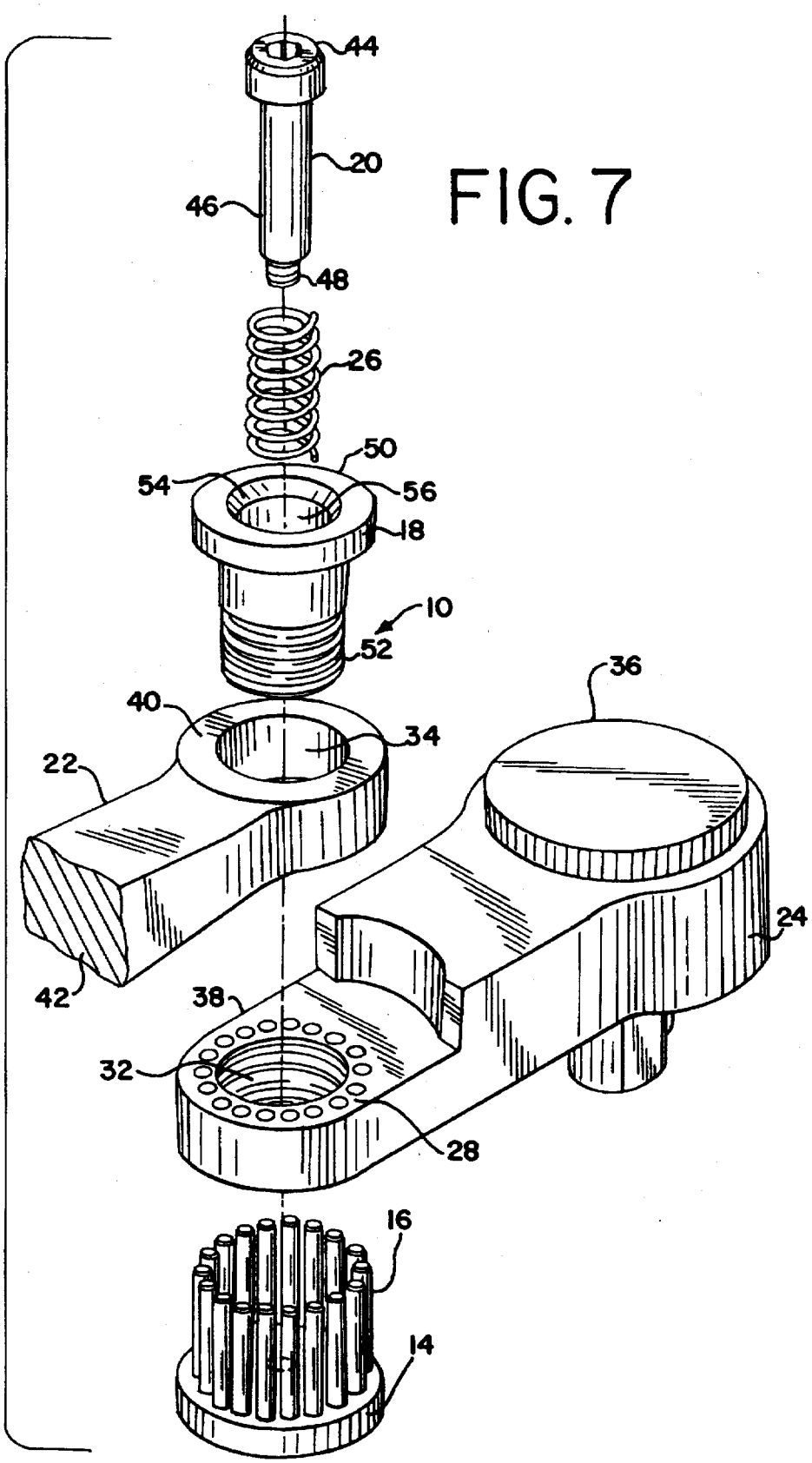
FIG. 7 is an exploded view of the locking joint of the subject invention.
Figure 10:
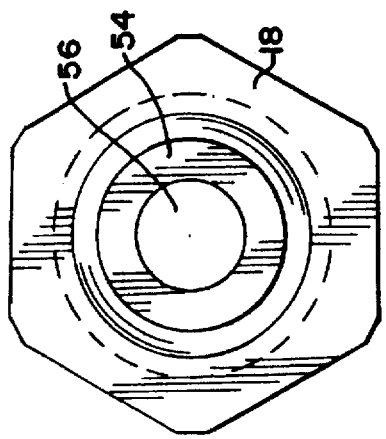
FIG. 10 is a top view of the guide bolt.
Figure 11:
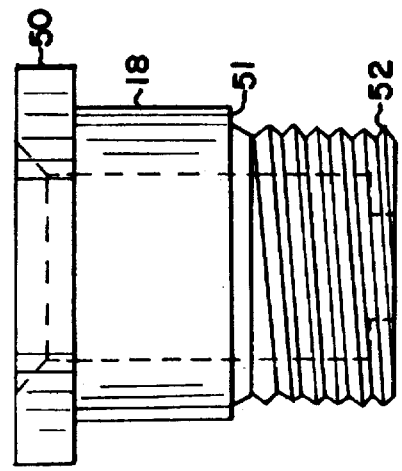
FIG. 11 is a side view of the guide bolt.

As shown with particularity in FIGS. 7, 10 and 11, the guide bolt 18 has a counter bore 56 for receiving the shoulder bolt 20. A chamfer 54 guides the movement of the shoulder bolt 20. The ledge 50 of the guide bolt 18 rests upon the mounting end 40 of the handle 22. The guide bolt 20 preferably has an externally threaded end 52. This externally threaded end 52 serves as the male portion of a male/female connection between the guide bolt 52 and the ratchet head assembly 24 further described below. As shown in FIG. 11, the guide bolt preferably has a shoulder 51 to act as a stop.

As shown in the preferred embodiment depicted in FIG. 7, the locking joint 10 also has a spring 26 positioned within the counter bore 56 of the guide bolt 18 and surrounding the shank 46 of the shoulder bolt 20. The spring 26 in connection with the shoulder bolt 20 propels the plurality of pins 14 to extend into and engage the handle 22 when the shoulder bolt 44 is released. The spring 26 may be substituted with a different type of biasing member in the locking joint 10.

The locking joint 10 of the present invention is suitable for use in a ratchet wrench 12 having a ratchet head assembly 24 and a handle 22. The subject invention may be used with most types of ratchet wrenches and ratchet head assemblies. For example, the locking joint 10 can be used with flat jawed or socket wrenches. The ratchet head assembly 24 has a ratchet head 36 and a mounting bracket 38. The mounting bracket 38 comprises a first set of apertures 28. As clearly shown in FIG. 7, the mounting bracket 38 also comprises a first opening 32. In the preferred embodiment the first opening 32 is internally threaded to connected with the externally threaded end 52 of the guide bolt 18 to form a male/female connection.

Figure 8:
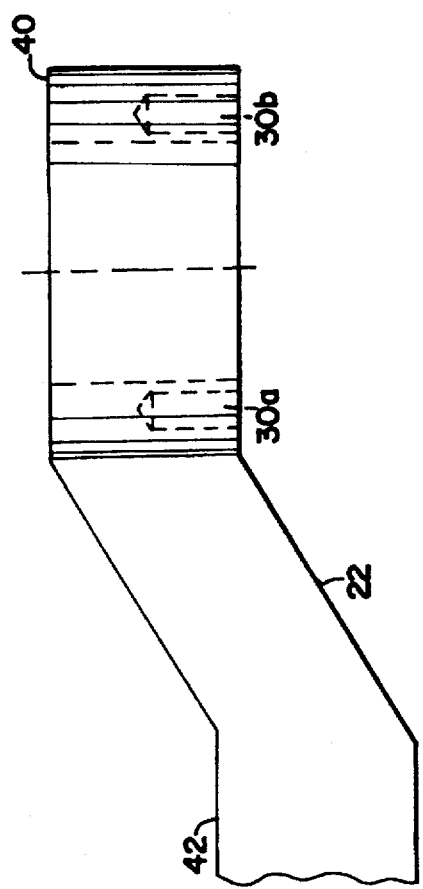
FIG. 8 is a side view of the handle where the handle is optionally stepped.
Figure 9:
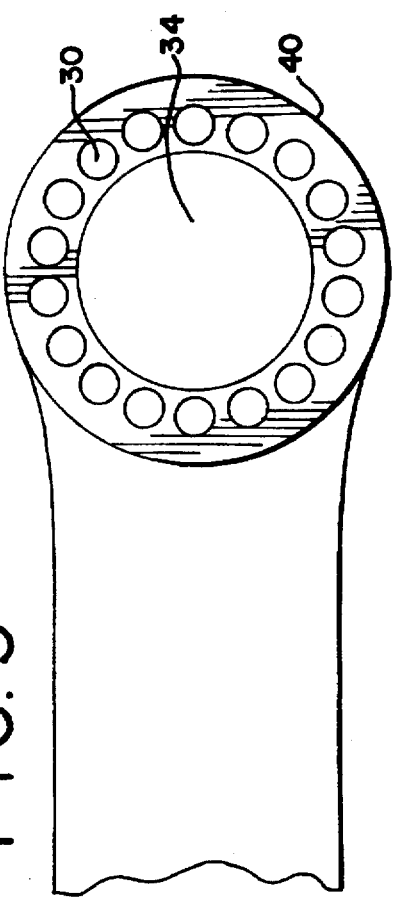
FIG. 9 is a bottom view of the handle of the ratchet head assembly.

As shown in detail in FIGS. 8 and 9, the handle 22 of the ratchet wrench 12 of the present invention comprises a mounting end 40 and a gripping end 42. The mounting end 40 of the handle 22 comprises a second set of apertures 30a, 30b (shown in phantom in FIG. 8). The mounting end 40 also includes a second opening 34 extending through the handle 22 for receiving and aligning the guide bolt 18. As shown in FIG. 8, the gripping end 42 of the handle 22 may be stepped to accommodate a variety of useful angles for difficult to reach places.

FIG. 7 clearly depicts the manner in which the present invention is assembled. The spring 26 surrounds the shoulder bolt 20 and is placed within the counter bore 56 of the guide bolt 18. The guide bolt 18 is positioned with the second opening 34 of the mounting end 40 of the handle 22 extending within and connecting to the first opening 32 of the mounting bracket 38 of the ratchet head assembly 24. The plurality of pins 16 of the pin cage 14 are positioned within the first set of apertures 28 of the mounting bracket 38 of the ratchet assembly 24. The threaded end 48 of the shoulder bolt 20 is connected to the hole 60 of the pin cage 14.

As shown in FIG. 1, to lock the handle 22 and the ratchet head assembly 24 at a fixed position and a fixed angle, the shoulder bolt 20 is released, the spring 26 expands, the first and second set of apertures 28, 30 align to form a plurality of pin orifices 58a, 58b, and the plurality of pins 16 extend within the handle 22. Therefore, the plurality of pins 16, the guide bolt 18, and shoulder bolt 20 maintain the handle 22 and the ratchet head assembly 24 in a fixed position at a fixed angle. The guide bolt 18 while maintaining the alignment of the locking joint 10, assists in absorbing the stresses created on the locking joint 10 as a result of the torsional force placed on the device by the user.

FIG. 2 depicts the locking joint 10 when it is unlocked and the handle 22 released. The user depresses the shoulder bolt 20 thereby compressing the spring 26. The pin cage 14 is forced to move outwardly away from the mounting bracket 38 of the ratchet head assembly 24 and the plurality of pins 16 move out from within the handle 22. The handle 22 is then free to move either in a clockwise or counterclockwise direction around the ratchet head assembly 24. After resetting the desired angle between the handle 22 and the ratchet head assembly 24, the shoulder bolt 20 is released. As the spring 26 biases the shoulder bolt 20, the plurality of pins 16 slidably extend within the pin orifices 60 into the handle 22 and the handle 22 and ratchet head assembly 24 is again locked into place.

The foregoing detailed description has been given only by way of example and it will be understood by those skilled in the art that many modifications may be made in the structure of the illustrated and described preferred embodiments without departing from the scope of the invention as herein claimed.

I claim:

1. A ratchet wrench comprising:

a ratchet head assembly having a ratchet head and a mounting bracket formed on said ratchet head assembly, said mounting bracket having a first set of apertures positioned in and extending through said bracket;

a handle having a gripping end and a mounting end, said mounting end having a second set of apertures adapted to align with said first set of apertures in any of a variety of orientations; and a locking joint disposed between said ratchet head and said gripping end of said handle, said locking joint having a pin cage including a plurality of pins adapted to engage said handle, a shoulder bolt coupled to said pin cage, and a guide bolt coupled to said ratchet assembly and having a counter bore for receiving said shoulder bolt.

2. The ratchet wrench of claim 1 wherein said guide bolt further comprises a ledge and a threaded end positioned opposite said ledge.

3. The ratchet wrench of claim 2 wherein said mounting end of said handle is rotatably positioned between said ledge and said mounting bracket.

4. The ratchet wrench of claim 3 wherein said shoulder bolt comprises a shoulder head integrally connected to a shank and is threaded at one end for connecting to said pin cage.

5. The ratchet wrench of claim 1 wherein said first and said second set of apertures are aligned to effect a plurality of pin orifices for receiving said plurality of pins.

6. The ratchet wrench of claim 4 whereby said shoulder head is depressed and said plurality of pins disengage said handle.

7. The ratchet wrench of claim 1 wherein said guide bolt is chamfered for restricting movement of said shoulder bolt.

8. The ratchet wrench of claim 1 further comprising a spring positioned within said counter bore for slidably engaging said plurality of pins within said mounting end of said handle.

9. A locking joint for a ratchet wrench having a ratchet head assembly including a ratchet head and a mounting bracket formed on said ratchet head assembly and a handle including a gripping end and a mounting end, said locking joint comprising:

a pin cage having a plurality of pins, said plurality of pins adapted to engage said handle;

a shoulder bolt having a shoulder head, a shank and a threaded end, said shank connected to said shoulder head at one end and to said threaded end at the other end, said shoulder bolt being connected to said pin cage at said threaded end whereby said shoulder head is depressed and said plurality of pins slidably disengage said handle;

a guide bolt having a counter bore for receiving said shoulder bolt, a ledge formed around said counter bore and a chamfer positioned within said counter bore for restricting the movement of said shoulder bolt; and a biasing member positioned within said counter bore and around said shank for disengaging said plurality of pins from within said handle.

10. The locking joint of claim 9 wherein said biasing member is a spring.

* * * * *